April 27, 1965    M. ALIMANESTIANU ETAL    3,180,500
VEHICLE PARKING SYSTEM
Filed Sept. 27, 1960    2 Sheets-Sheet 1
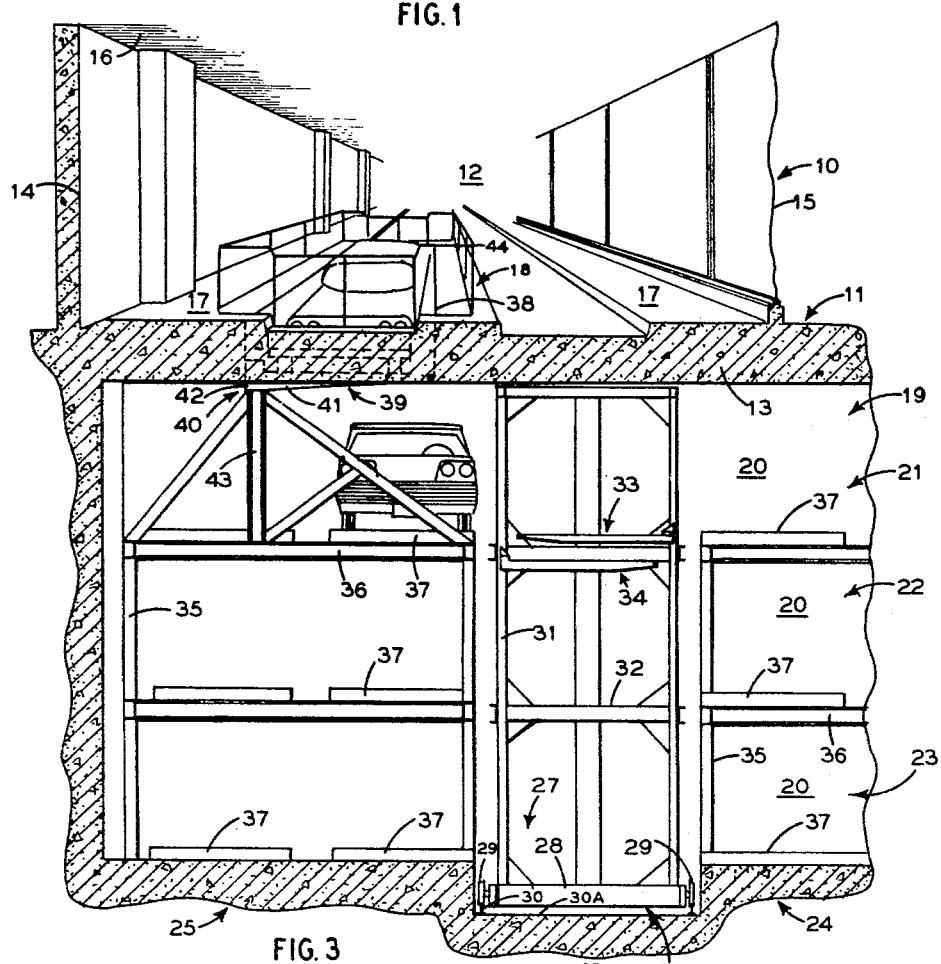
*INVENTORS*
Mihai Alimanestianu
BY Serban Alimanestianu
ATTORNEY April 27, 1965  M. ALIMANESTIANU ETAL  3,180,500
VEHICLE PARKING SYSTEM
Filed Sept. 27, 1960  2 Sheets-Sheet 2
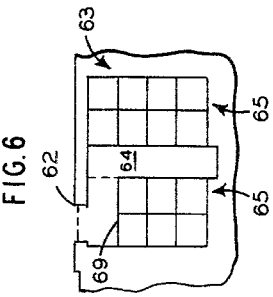
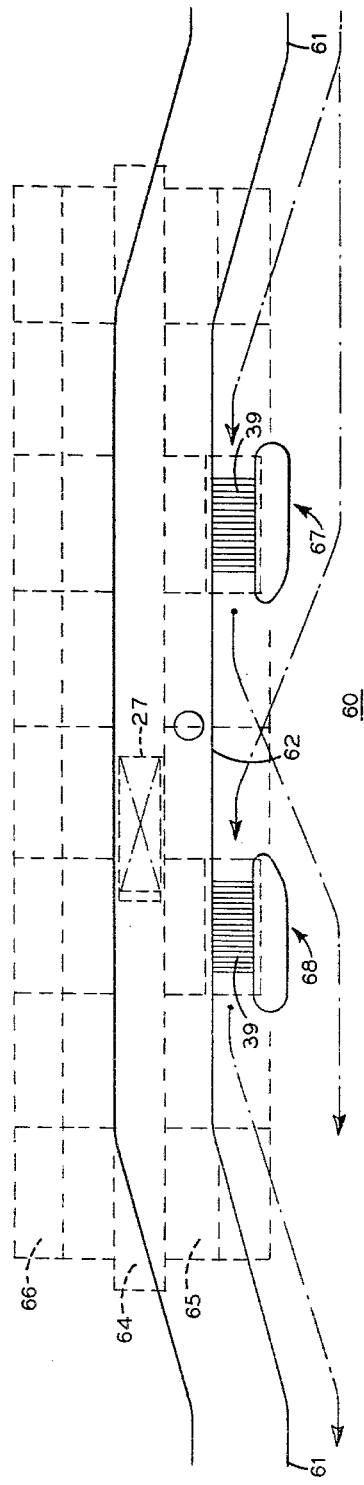
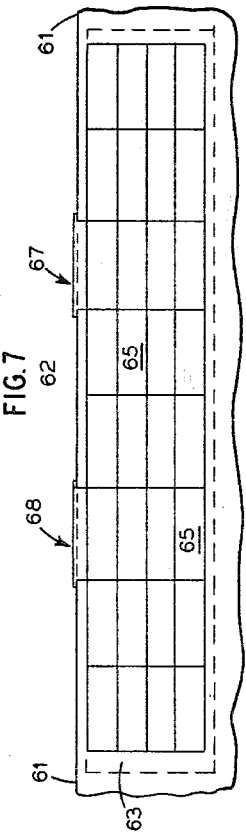
INVENTORS
Mihai Alimanestianu
BY Serban Alimanestianu
ATTORNEY United States Patent Office 3,180,500
Patented Apr. 27, 1965

3,180,500
VEHICLE PARKING SYSTEM
Mihai Alimanestianu and Serban Alimanestianu, Upper Nyack, N.Y., assignors to Speed-Park, Inc., New York, N.Y., a corporation of New York
Filed Sept. 27, 1960, Ser. No. 58,798
7 Claims. (Cl. 214—16.1)

This invention relates to vehicle parking systems, and more particularly, concerns parking systems of the stall type.

In order to obtain maximum utility of space in parking garages or the garage portion of a building of general uses such as offices, apartments or combinations thereof, it has been proposed to arrange vehicle parking areas in the form of vertical tiers of parking stalls. In such arrangements, vehicles are transferred to and from the stalls by a movable transfer device adapted to pick up or deliver a vehicle from a station in a vehicle passageway.

The transfer device moves in a passageway which is laterally adjacent the vehicle passageway to allow for the transfer operation at the station level. Such transfer passageway extends from the station level to a level coextensive with that of the topmost stall in the tier and extends longitudinally in accordance with the number of veritcal tiers of stalls. Thus, the transfer device has horizontal and vertical movement to bring the same into alignment with as elected parking stall in a selected tier of stalls and at a selected horizontal level in such tier of stalls.

With such known arrangements, since the passageway for the transfer device extends from the station level, the parking garage or building incorporating the same, must necessarily provide at the ground level thereof space having width sufficient to accommodate both vehicle and transfer passageways. Inasmuch as such parking facilities are usually located in congested urban areas where land and space costs are extremely high, ground level space may be so expensive as to preclude the inclusion of such known parking facilities by reason of the substantial space requirements at the ground level for both the vehicle and transfer passageways.

Accordingly, one object of this invention is to provide an improved vehicle parking system of the general character described, wherein the conventional transfer space at the ground level is omitted, leaving only a vehicle passageway requirement at said ground level, thereby substantially reducing the overall space requirement at the ground level and making a parking facility commercially feasible.

A further object of this invention is to provide an improved vehicle parking system of the character described wherein vehicle transfer space is arranged for communication with a vehicle passageway at a horizontal level spaced from the ground level of the vehicle passageway with primary transfer means movable in the transfer space and auxiliary transfer means for carrying and transferring a vehicle between the vehicle passageway at ground level and the primary transfer means at the level spaced from the ground level, whereby said primary transfer means may transfer the vehicle between a selected parking stall and the primary transfer means.

Still another object of this invention is to provide an improved vehicle parking system wherein a single passageway is provided at ground level for incoming and outgoing vehicles, together with a transfer passageway or shaft which communicates with the vehicle passageway at a horizontal level vertically displaced above or below the ground level, elevator means operating in the transfer passageway or shaft and including vehicle transfer means for transferring vehicles between the elevator and tiers of parking stalls located above or below the vehicle passageway, together with second elevator means connecting the vehicle passageway with the transfer passageway or shaft to transfer vehicles between the two elevator means.

Yet another object of this invention is to provide a vehicle parking system for a building structure having vertical tiers of parking stalls, a vehicle passageway in the structure for incoming and outgoing vehicles, a transfer passageway or shaft communicating with the vehicle passageway at a horizontal level above or below the level of the vehicle passageway together with an elevator in the transfer passageway or shaft including vehicle transfer means, a second elevator in the vehicle passageway including means for allowing transfer of vehicles between the elevators, together with parking stalls in operative relation to the first elevator for transferring vehicles therebetween, the vehicle passageway being accessible on either side thereof and the space on either side of the vehicle passage being available for commercial usage.

Still another object of this invention is to provide a sub-ground level vehicle parking structure in which the entrance and exit portions thereof may be limited to a vehicle station of minimized length and width measured by the length and width of a vehicle.

Other objects of this invention will in part be obvious and in part hereinafter pointed out.

In the drawings, FIG. 1 is a perspective view of a vehicle parking system embodying the invention;

FIG. 2 is a vertical sectional view showing a modified form of the invention;

FIG. 3 is a plan view of a portion of vehicle parking means illustrating still another form of the invention;

FIG. 4 is a plan view of a typical level thereof;

FIG. 5 is a plan view of a vehicle parking system embodying the invention and applicable sub-ground level arrangements with entrance and exit available at street curbing;

FIG. 6 is a transverse view thereof; and

FIG. 7 is a longitudinal view thereof.

Essentially, the vehicle parking system of the instant invention comprises an arrangement of a vehicle passageway for incoming or outgoing vehicles at a given level and a transfer passageway or shaft extending downwardly from a level below the given level or upwardly from a level above the given level, with a vehicle conveyor and transfer means operating in the transfer passageway or shaft in relation to tiers of parking stalls, together with a second vehicle conveyor for effecting transfer of an incoming or outgoing vehicle between the given level and the first vehicle conveyor and transfer means.

Thus, the transfer passageway or shaft is vertically offset with respect to the vehicle passageway, thereby limiting the lateral dimensions of the space requirement at the given level to the vehicle passageway only.

Referring in detail to the drawings, one embodiment of the invention is shown in FIG. 1, wherein a building structure generally indicated at 10, includes wholly or as a portion thereof, a vehicle parking facility located below a given level 11, which may be the ground level, said parking facility thus being disposed in a basement portion of structure 10.

At level 11 is a vehicle passageway 12 for incoming and outgoing vehicles. Passageway 12 may be defined by floor 13, side walls 14, 15 and a top wall 16. Passageway 12 may be of minimal width with provision for foot passages 17; or may be of somewhat extended width to accommodate through traffic as well as vehicles moving in a path to or from a station 18 located at a given point in the passageway.

A vehicle parking space, generally designated at 19, is located below floor 13 of structure 10, as in the basement thereof. Said space 19 is subdivided to provide vehicle parking stalls 20 in end to end relation and at multiple levels 21, 22 and 23. Furthermore, stalls 20 are arranged in parallel rows 24, 25 spaced by a transfer passageway 26 extending longitudinally therebetween.

Within passageway 26 is a vehicle conveyor 27 having a base portion 28 and wheels 29 thereon for moving over rails 30 located on the bottom 30a of the passageway 26. Extending upwardly from base portion 28 is a framework comprising uprights 31 and cross members 32; the framework extending to the underside of floor 13.

A pair of transfer members 33, 34 are mounted on the uprights 31 for vertical movement. Each transfer member 33, 34 is in the form of a comblike element with parallel fingers extending from a backbone. The fingers of members 33, 34 extend toward each other and are in interdigitated relation when such fingers are colevel; the backbones of the members 33, 34 being oppositely disposed on the sides of the framework. Means, not shown is provided for effecting independent movement of the transfer members 33, 34 so that the same may pass each other vertically to selected horizontal levels.

Stalls 20 are suitably formed by a skeleton structure of upright members 35 and cross members 36 to support suitable floor structures in each stall, said floor structures comprising spaced, parallel, elongated, load receiving members 37 which open at one end thereof on passageway 26.

The fingers of transfer members 33, 34 are cantilevered and the members are mounted at their opposite ends in suitable slides, not shown, for projected movement horizontally so that the fingers of said members 33, 34 may be disposed in interdigitated relation to load receiving members 37. The details of construction of transfer members 33, 34 and the manner in which the same are projected and retracted, is disclosed in patent 2,915,204.

While stalls 20 may be arranged in a single, longitudinally extending row in operative relation to passageway 26; said stalls may also be arranged in double rows as indicated in FIG. 1, with one row of stalls immediately adjacent passageway 26 and the other row of stalls remote from said passageway. In this case, the mechanism for effecting the horizontal movement of transfer members 33, 34 may be of the double-throw type, described in detail in application Ser. No. 765,584, filed October 6, 1958, now Patent No. 3,063,579. Thus a vehicle may be transferred to and from a stall 20 which is either immediately adjacent passageway 26 or remote therefrom.

Station 18 is defined in passageway 12 by a rectangular shaped opening 38 in floor 13. Opening 38 constitutes the upper end of a conveyor shaft in which a conveyor 39 is arranged for limited vertical movement below floor 13. Conveyor 39 may also take the form of a single comblike element 40 having fingers 41 extending from a backbone member 42. The opposite ends of conveyor 39 are mounted for slidable, vertical movement on uprights 43, with mechanism, not shown, for raising and lowering conveyor 39 between level 11 and a depressed level within space 19 which is in horizontal alignment with the top level 21 of stalls 20.

A vehicle entering passageway 12 is adapted to stop at station 18 at which time the same will be resting on the fingers of conveyor 39 when said conveyor is raised to its elevated position. Conveyor 39 is then depressed to its lower position for lateral alignment with transfer members 33, 34; conveyor 27 having been moved over rails 30, by means not shown, to a position to align the same with conveyor 39 and the transfer members 33 or 34 having been vertically positioned in horizontal alignment with the fingers 41 of conveyor 39.

Upon projecting transfer member 33 horizontally to allow the fingers thereof to interdigitate with the fingers of conveyor 39; the vehicle carried on conveyor 39 may be transferred to conveyor 27 by slightly raising transfer member 33 and then retracting the same back into conveyor 27. Conveyor 27 may now move on rails 30 to align the same with a particular vertical tier of parking stalls. Thereupon, if the vehicle is to be deposited in a vacant stall 20 which happens to be on the right side of passageway 26, then transfer member 34 is made operative to project the same horizontally to interdigitate the fingers thereof with load receiving members 37 therein, to effect the transfer of the vehicle to said load receiving members. Such transfer operation may also include suitable vertical movements of the transfer member 34 as well as horizontal movements of the slide thereon.

Similarly, if the vacant stall 20 happens to be on the left side of passageway 26, then transfer member 33 is operated in the manner described above to effect the transfer of the vehicle to the stall 20. It is understood that while either of transfer members 33 or 34 is in operation, the other transfer member may be depressed to a position on conveyor 27 where it does not interfere with such operations.

Safety barrier means 44 is provided at opening 38 in floor 13. Such barrier means may take the form of an upright rectangular shaped framework which is arranged for vertical movement between a depressed inoperative position when a vehicle is approaching station 18; and an elevated operative position when the conveyor 39 is in operation to carry a vehicle to its transfer position relative to conveyor 27. Suitable means, not shown, effect the vertical movement of barrier means 44.

It will be apparent that conveyors 27, 39 may be operated in a correlated manner to effect a speedy transfer of a vehicle between the same, as such vehicle is moved from station 18 to a selected stall 20 to park the same, or from stall 20 to station 18 at the end of a parking period.

In any case, with transfer passageway 26 depressed below level 11, vehicle passageway 12 may be of a selected width to provide single or dual paths for the movement of vehicles into and out of the passageway 12; yet allowing walls 14, 15 to define usable space in structure 10 which is immediately adjacent passageway 12. It is understood that the total parking capacity of space 19 is defined by the length of rows 24, 25; the number of levels in each row; and the number of stalls at each level on each side of passageway 26.

While the parking system has been described in terms of vehicle receiving space below ground level; the system is also applicable where the parking space is located above ground level, as shown in FIG. 2. Here, building structure 10A has its parking space 19A in the form of vertical tiers of stalls 50, 51 raised above ground level 11. Stalls 50, 51 are separated by a transfer passageway 26A in which a conveyor 27A, similar to conveyor 27, operates.

In this case, conveyor 39A located in passageway 12 at a vehicle receiving zone therein, is elevated to a position 52 by suitable means, not shown, where conveyor 39A is aligned with conveyor 27A to effect transfer of a vehicle therebetween, all in the manner previously described. Thus, vehicles may be transferred to and from stalls 50, 51 by the use of transfer members similar to transfer members 33, 34, in the manner described above. Here again, vehicle passageway 12 may be of selected width with adjacent portions of structure 10A available as desired.

Barrier means, of the type previously described, may also be applied to the system shown in FIG. 2; thus affording protection at the vehicle receiving station in passageway 12 while conveyor 39A is moving between its ground level position and its elevated transfer position. It is understood that the floor structure of transfer passageway 26A is designed to carry the weight of conveyor 27A and is provided with rails and the like, not shown, to allow for longitudinal movement of the conveyor 27A in said passageway. It is also understood that passageway 26A may take the form of a shaftway with single tiers of parking stalls on either side thereof or on one side thereof, as desired.

As shown in FIGS. 3 and 4, vehicle passageway 12 may accommodate a plurality of vehicle stations 18, each equipped with a conveyor 39A, to facilitate the transfer operations between the parking stalls and the vehicle passageway. Thus, the structure 10B, may be provided with a pair of conveyors 27 moving in passageway 26, with each conveyor 27 servicing one half the structure. The stalls 20 are shown in double rows at each level and on opposite sides of passageway 26. Accordingly, the transfer members on conveyors 27 would be of the double throw type more fully disclosed in said pending application Ser. No. 765,584, now Patent No. 3,063,579.

With conveyors 39A on opposite sides of vehicle passageway 12, the same may be used serially in correlation with a single conveyor 27 to insure optimum use of all equipment at all times and to decrease the parking or delivery time cycles.

The parking system of the instant invention also lends itself in an efficient manner to below ground level parking which may be directly accessible from a street curb. Thus, as shown in FIGS. 5, 6 and 7, a conventional city thoroughfare is indicated at 60 with the usual curb at 61. The curb line is indented as at 62 for a length equal to somewhat more than the length of two vehicles and a width equal to that of a single vehicle, thus allowing a vehicle to swing out of a usual traffic lane for the purpose of approaching or leaving the indented curb line 62.

A below level parking space generally indicated at 63 is located adjacent along one longitudinal edge thereof in vertical alignment with curb line 61. The space 63 is subdivided into tiers and rows of parking stalls at a selected number of levels and may be arranged on either side of a pasageway 64, the stalls being indicated at 65, 66.

A pair of longitudinally spaced conveyors 39 at vehicle stations 67, 68 are provided for depressed movement to a level 69 where such conveyors may be horizontally aligned with conveyors similar to conveyors 27, previously described, to effect the transfer of vehicles therebetween, all in a manner described above.

It will be apparent that a vehicle may move out of the usual traffic lanes in thoroughfare 60 to approach either of the stations 67, 68 to be received on a conveyor 39 and thereafter transferred to a conveyor similar to conveyor 27, which moves in passageway 64 for transfer to a selected stall 65 or 66. Vehicles may be delivered from a stall 65 or 66 to either of stations 67, 68 at the end of their parking periods, in a similar manner. Thus, vehicle parking may be effected directly from moving traffic without resort to approaches, ramps or other space consuming means, and still permit orderly traffic movement immediately adjacent the pickup or delivery stations 67, 68 immediately at curbline 62.

As various changes might be made in the embodiments of the invention herein described without departing from the spirit thereof, it is understood that all matter herein shown or described shall be deemed illustrative and not limiting except as set forth in the appended claims.

Having thus disclosed our invention, we claim as new and desire to protect by Letters Patent:

1. A vehicle parking structure having only a single vehicle pasageway extending longitudinally of said structure for passing vehicles into and out of said structure at a first horizontal level, said structure having a vehicle handling width at said first level substantially limited to the width of said vehicle passageway, a single multilevel transfer passageway laterally adjacent said vehicle passageway and extending vertically from a second horizontal level once removed from said first level and away from said first level, a first vehicle conveyor having limited vertical movement between a first position in a portion of said vehicle passageway and a second position in said second level, a second vehicle conveyor movable vertically in said transfer passageway, said second conveyor being disposable in a terminal portion of said transfer passageway at said second level, colevel and horizontally aligned with said first conveyor when said first conveyor is in its second position, a vertical tier of parking stalls on at least one side of said transfer passageway and opening directly on said transfer passageway, said second conveyor including vehicle transfer means for selective horizontal alignment with said first vehicle conveyor when said conveyors are colevel or in horizontal alignment with a parking stall at a selected level in said tier of parking stalls, said vehicle transfer means including transfer members arranged for lateral projected and retracted movement into and out of said parking stalls, said transfer members being operative to transfer a vehicle between said conveyors and between said second conveyor and a selected stall.

2. A vehicle parking system as in claim 1 wherein said vehicle passageway is at a ground level and said transfer passageway is below said ground level.

3. A vehicle parking system as in claim 1 wherein said vehicle pasageway is at a ground level and said transfer passageway is above said ground level.

4. A vehicle parking structure as in claim 1 wherein a vertical tier of parking stalls is vertically aligned with said first conveyor and extending away from said second level.

5. A vehicle parking structure as in claim 1 wherein each transfer member comprises a comblike element having projecting parallel fingers and a pair of said transfer members is arranged with their fingers in interdigitating relation and their respective backbone portions on opposite sides of said transfer means.

6. A vehicle parking structure as in claim 1 wherein a plurality of multilevel tiers of parking stalls are disposed on opposite sides of said transfer passageway and open directly on said transfer passageway, one of said tiers of parking stalls on one side of said transfer passageway being vertically aligned with and extending from a station in said vehicle passageway vertically aligned with said first conveyor.

7. A vehicle parking structure as in claim 1 wherein said transfer passageway extends longitudinally of said structure and a plurality of multilevel tiers of parking stalls are disposed on at least one side of said transfer passageway.

References Cited by the Examiner

UNITED STATES PATENTS

| 1,771,695 | 7/30 | Tompkins. |
| 1,915,973 | 6/33 | Black et al. |
| 2,303,656 | 12/42 | Orr. |
| 2,598,750 | 6/52 | Bargehr. |
| 2,818,186 | 12/57 | Sinclair. |
| 2,915,204 | 12/59 | St. Alimanestiano. |
| 2,923,421 | 2/60 | De Senignon de Roumefort 214—16.12 |

FOREIGN PATENTS

| 602,179 | 6/25 | France. |
| 686,887 | 7/30 | France. |

HUGO O. SCHULZ, *Primary Examiner.*

GERALD M. FORLENZA, ERNEST A. FALLER, Jr., *Examiners.*